United States Patent [19]
Jackson et al.

[11] Patent Number: 4,753,444
[45] Date of Patent: Jun. 28, 1988

[54] SEAL AND SEAL ASSEMBLY FOR WELL TOOLS

[75] Inventors: Alan T. Jackson, Coppell; Thomas W. Ray, Plano; Eduardo Alvarez, Houston, all of Tex.

[73] Assignee: Otis Engineering Corporation, Dallas, Tex.

[21] Appl. No.: 925,279

[22] Filed: Oct. 30, 1986

[51] Int. Cl.$^4$ .............. F16J 15/46; F16J 15/56; C08G 8/02; E21B 33/128
[52] U.S. Cl. .................................... 277/230; 277/31; 277/DIG. 6; 166/120; 166/179; 166/196; 524/496; 524/520; 525/153
[58] Field of Search ............ 277/30, 31, 227–230, 277/DIG. 6; 524/496, 520; 525/153; 166/120–122, 179, 187, 196

[56] References Cited

U.S. PATENT DOCUMENTS

| 4,296,806 | 10/1981 | Taylor et al. | 277/DIG. 6 X |
| 4,592,782 | 6/1986 | Davies | 524/440 X |
| 4,611,658 | 9/1986 | Salerni et al. | 277/230 X |
| 4,638,044 | 1/1987 | Kelsey | 528/175 X |
| 4,654,263 | 3/1987 | Cox | 524/404 X |
| 4,665,978 | 5/1987 | Luke | 166/196 |
| 4,709,758 | 12/1987 | Preston | 166/120 |

FOREIGN PATENT DOCUMENTS 2144518 3/1985 United Kingdom ......... 277/DIG. 6

Primary Examiner—Robert S. Ward
Attorney, Agent, or Firm—H. Mathews Garland

[57] ABSTRACT

A seal and seal assembly for use with well tools, such particularly as well packers, for sealing the annulus between the well packer mandrel and the wall of a well tubing such as casing. The seal is fabricated of an elastomeric-like material comprising fluorocarbon resins, poly arylene ketone, and carbon fibers mounted between end retainer assemblies each comprising a mesh anti-extrusion ring, a tapered mesh backup ring, and a metal backup shoe. The seal has internal longitudinally spaced V-shaped recesses to cause the seal to buckle radially outwardly as it is compressed longitudinally to increase the stress along the middle portion of the seal where the seal meets the well casing inner wall. The seal is useful at high temperatures and pressures such as 550 degrees F. and greater than 15,000 psi.

20 Claims, 1 Drawing Sheet

SEAL AND SEAL ASSEMBLY FOR WELL TOOLS

BACKGROUND OF THE INVENTION

This invention relates to well tools and more particularly to seals and seal assemblies for use on well tools and the like.

History of the Prior Art

The production of wells, especially oil and gas wells, requires equipment including well packers connected in the well production tubing strings for sealing between the tubing strings and the wall of the well bore for isolating vertical zones along the well bore through which production into the tubing string occurs. Such packers include annular seal assemblies which perform the sealing function. Often wells are drilled to extreme depths where both high temperatures and pressures may require special consideration and protection. Additionally, the well fluids in such wells often produce substantial adverse chemical reactions such as corrosion of the materials forming the seals.

Seal assemblies on oil well packers and the like often operate at such high temperatures and pressures that the material which effects the seal tends to extrude, thereby reducing if not destroying the effectiveness of the seal. Also, the wide range of temperatures and pressures under which such seals operate may produce stress cracks which reduces the effectiveness of the seal obtained. For example, the temperature may be as high as 600 degrees F., and the pressure in excess of 15,000 psi. Well packers typical of the type used in such wells are illustrated and described in U.S. Pat. No. 4,457,369 issued July 3, 1984 to William D. Henderson, and U.S. Pat. No. 4,487,258 issued Dec. 11, 1984 to Alan T. Jackson and William D. Henderson, both assigned to Otis Engineering Corporation. The well packers shown in both such patents may utilize the annular seal assembly of the present invention. U.S. Pat. No. 4,524,981 issued June 25, 1985 to Daniel L. Hertz, Jr., also shows an annular seal which may be used in well packers.

It is, therefore, a principal object of the invention to provide a new and improved annular seal and a seal assembly for well tools which functions effectively under high temperature and pressure conditions.

It is another object of the invention to provide a seal and annular seal assembly which will function effectively over a wide range of temperatures and pressures.

It is another object of the invention to provide a seal and seal assembly which will not extrude at high temperatures and pressures.

It is another object of the invention to provide a seal and seal assembly in which stress cracks are not produced over the wide ranges of temperatures under which the seal functions.

It is another object of the invention to provide an annular seal assembly for sealing between concentric spaced surfaces at high temperatures and pressures.

It is another object of the invention to provide a seal and seal assembly which is especially useful on oil and gas well tools.

SUMMARY OF THE INVENTION

In accordance with the invention, an annular seal and seal assembly for sealing between concentric spaced surfaces in well tools includes a central annular expandable seal element fabricated of an improved polymeric composition consisting essentially of fluorocarbon resins, poly arylene ketone, and carbon fibers. The polymeric seal has internal longitudinally spaced annular grooves providing outward buckling as the seal is longitudinally compressed. The seal is mounted on a well tool between end retaining assemblies each comprising a mesh anti-extrusion ring, a mesh backup shoe, and a steel backup shoe at each outer end of the assembly.

The specific details and characteristics and advantages of the invention will be apparent from the following detailed description in conjunction with the accompanying drawing.

DESCRIPTION OF THE PREFERRED EMBODIMENT

Figure 1:
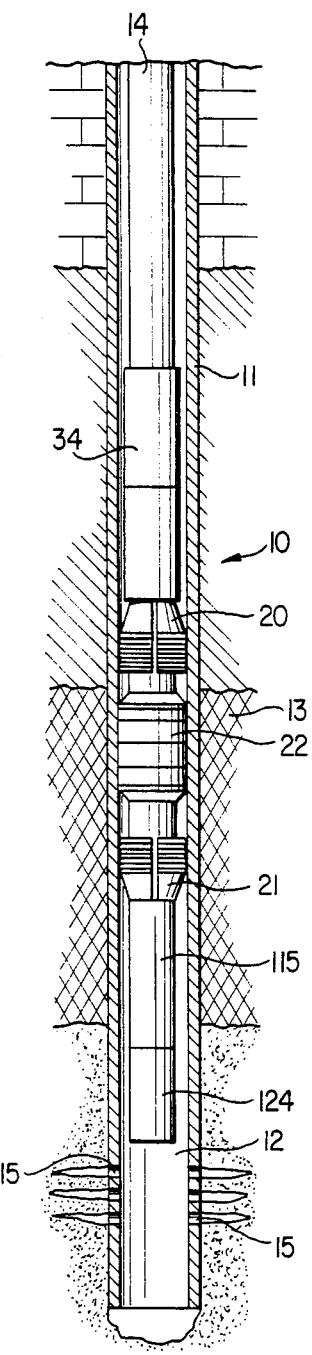
FIG. 1 is a longitudinal schematic view in section and elevation showing a well packer including a seal and seal assembly embodying the features of the invention set in the core of a well and connected with a production tubing string.

Referring to FIG. 1, a well packer 10 including a seal and seal assembly embodying the features of the invention is set in a well casing 11 lining a earth formation well bore 12 drilled into an oil and gas producing formation 13. The packer is connected with a production tubing string 14 leading to a well head, not shown, at the surface end of the well for conducting produced fluids from the earth formation to the well head. The casing is perforated at 15 to allow well fluids, such as oil and gas, to flow from the formation through the casing into the well bore. The packer is releasably locked with the casing wall by upper slips 20 and the lower slips 21. The packer includes a seal 22 embodying the features of the invention which is expanded against the casing wall by longitudinal compressive forces forming a fluid-tight seal around the packer so that formation pressure is held in the well bore below the seal assembly and formation fluids are thus forced through the bore of the packer to flow to the surface through the production tubing 14. The packer is normally run into the well bore and set by means of a suitable running tool, not shown, which operates the upper and lower slips and expands the seal. The seal 22 is capable of establishing and retaining a seal with the inner wall of the casing at temperatures as high as at least about 600 degrees F., and the pressures higher than 5000 psi. In accordance with the invention, the seal 22 does not extrude at such elevated temperatures and pressures, is subjected to the substantial temperature changes without cracking, and effectively resists chemicals encountered in the well bore.

Figure 2:
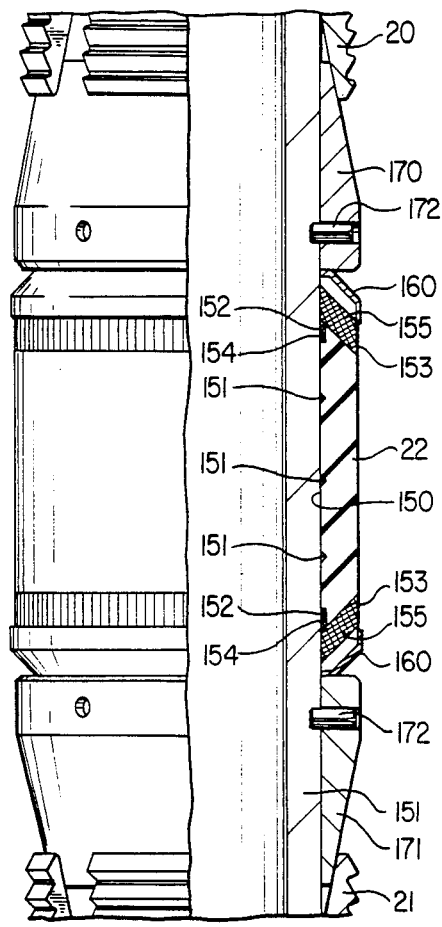
FIG. 2 is a fragmentary longitudinal view in section and elevation of the seal and seal assembly of the invention mounted on a well packer as illustrated in FIG. 1.
Figure 3:
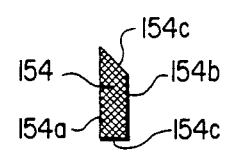
FIG. 3 is view in cross section of one of the mesh anti-extrusion rings in the seal assembly of FIG. 2.

Referring to FIG. 2, the seal 22 is a tubular member having a bore 150 sized for mounting on a tubular mandrel 151 of the packer 10. The seal has internal, annular, longitudinally spaced grooves 151 which preferably are V-shaped. The seal is counterbored at opposite ends providing internal annular anti-extrusion ring recesses 152. The opposite ends of the seal are each provided with an external annular tapered surface 153 which slopes toward the end and inwardly toward the bore of the seal along each end portion of the seal. The seal 22 is fabricated of a composite of flurorocarbon resins, poly arylene ketone, and carbon fibers. The fluorocarbon resins are poly tetrafluoroethylene having a molecular weight of 7 to 10 million and a copolymer having a tetrafluoroethylene backbone with a fully fluorinated alkoxy side chain having a molecular weight of 250,000. The poly tetrafluoroethylene is available from E. I. duPont de Nemours & Co. (Inc.) under the name TEFLON PTFE 7A. The copolymer is also available from duPont under the name TEFLON PFA 350. The poly arylene ketone has a molecular weight of 14,000 and is available from Imperial Chemical Industries under the name VICTREX PEEK. The carbon fibers have a tensile strength of 200,000 pounds per square inch, a tensile modulus of 25,000,000 pounds per square inch, and a density of 0.072 pounds per cubic inch. The fluorocarbon resins consist essentially of 90–95% poly tetrafluoroethylene and 5–10% of the copolymer. Of the combined fluorocarbon resins and poly arylene ketone, 55%–65% of the mixture is fluorocarbon resins and 35%–45% is poly arylene ketone. The carbon fibers form about 20%–30% of the composite. Preferably, in the combined fluorocarbon resins and poly arylene ketone, 60% is fluorocarbon resins and 40% is poly arylene ketone. Taking the composite as a whole, preferably about 42% is poly tetrafluoroethylene, about 2% is the copolymer, about 29% is poly arylene ketone, and about 27% is carbon fiber. Also, considering the composite as a whole, the ranges of the materials are: 2%–5% of the copolymer; 35%–49% poly tetrafluoroethylene; 25%–36% poly arylene ketone; and 20%–30% carbon fiber.

The composite of fluorocarbon resins, poly arylene ketone, and carbon fibers is compounded in the following manner. The polymers are weighed out separately and then mixed together in a high intensity mixer, such as the Henschell type, for a sufficient time to homogenize the three ingredients. The carbon fiber is then added to the polymer mixture and mixed long enough to fully disperse the carbon fibers throughout the polymer flux.

The mixture of polymer flux and carbon fiber is then molded to the desired shape and size for final machining to form the seal 22 using generally standard compression molding techniques. A corrosion resistant mold cavity to provide the cylindrical shape required is filled with a predetermined amount of the mixed composite. The mold assembly is transferred to a hydraulic press and a preform pressure of 5,000 psi is applied to the assembly for 10 minutes. The mold with the composite contents is heated by means of heater bands positioned around the mold, or, alternatively, by loading the mold in a circulating air oven. The composite is sintered by heating to a temperature of about 30–50 degrees Fahrenheit above the melt point of the mixture, about 700 degrees F., for one hour for each one-half inch of wall thickness of the part being formed. The mold is then pressed with 10,000 psi and cooled to room temperature under about 2,500 psi presure. When the mold reaches room temperature the molded part is then removed from the mold and is annealed at 500 degrees F. for one hour per each one-half inch of wall thickness. The molded part is then removed from the mold and machined to provide the desired bore size and outside diameter and to properly shape the end portions and form the internal grooves 151.

Figure 4:
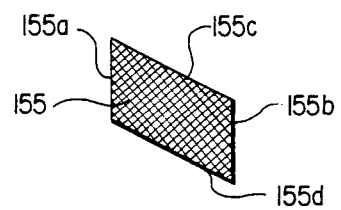
FIG. 4 is a view in cross section of one of the mesh backup rings in the seal assembly of FIG. 2.

As shown in FIG. 2, the seal 22 is mounted on the tool mandrel 151 between end retainer assemblies each of which comprises a mesh anti-extrusion ring 154, a mesh backup ring 55, and a backup shoe 160. The anti-extrusion ring 154 is an annular ring defined by concentric cylindrical inner and outer surface portions 154a and 154b, one end surface 154c aligned perpendicular to the surfaces 154a and 154b, and an opposite sloping end surface 154c. The surface 154c preferably slopes at a 45 degree angle from the shorter outer ring surface 154b toward the longer inner ring surface 154a. As shown in FIG. 4, the mesh backup ring 155 has a parallelogram cross section defined by cylindrical inner and outer surfaces 155a and 155b and tapered opposite end surfaces 155c and 155d. The end surfaces 155c and 155d are frustoconical surfaces which are parallel and lie at 45 degree angles with the side edges of the backup ring. The anti-extrusion rings 154 fit within the internal annular recesses 152 at each end of the seal 22. The mesh backup rings 155 fit against the tapered end surfaces of the seal 22 and the tapered end surfaces 154c of the anti-extrusion rings 154. The backup shoes 160 form the opposite end caps for the retainer assemblies and are each initially spaced inwardly of the backup rings 155, so that when compressive forces are applied to the end retainer assemblies and the seal 22, the anti-extrusion rings and backup rings tend to be forced into the backup shoes and spread radially for insuring the retaining of the end potions of the seal 22 between the mandrel 151 and the inner surface of the casing 11. The end retainer assemblies hold the seal 22 in place preventing extrusion at opposite ends as the seal is compressed longitudinally to form the desired contact with the inner surface of the well casing 11.

The anti-extrusion rings 154 and the backup rings 155 are fabricated of a woven mesh comprising a corrosion resistant metal wire preferably a nickel and copper alloy such as sold under the trademark MONEL, and asbestos fibers. The backup shoes 160 are preferably fabricated of mild sheet steel.

The seal 22 and the end retainer assemblies comprising the anti-extrusion rings 154, the mesh backup rings 155, and the backup shoes 160 are mounted on the packer mandrel 151 between upper and lower slip expander cones 170 and 171 each of which is secured by a shear pin 172 to the mandrel 151. The mandrel 151 along with the slip expander cones 170 and 171 and slips 20 and 21 form the locking and seal assembly structure of a typical well packer such as illustrated in specific detail in U.S. Pat. No. 4,487,258, supra. When the packer is operated as described in U.S. Pat. No. 4,487,258, forcing the slips 20 and 21 outwardly along the cone 170 and 171, shearing the pins 172 attaching the cones to the mandrel 151, longitudinal compressive forces are applied to the seal 22 through the end retainer assemblies. As the longitudinal compressive forces increase, the end retainer assemblies tend to collapse longitudinally and expand radially for retaining the seal 23 while the seal is compressed longitudinally expanding radially with the V-shaped internal recesses 151 causing the seal to buckle outwardly for improved radial expansion creating a higher stress in the seal material where the outer surface of the seal engages the inner surface of the casing 11. When the packer is fully set and the seal 23 completely expanded, as described in U.S. Pat. No. 4,487,258, the expanded seal effectively seals with the casing wall at substantial temperature and pressures. In a typical test of the seal and retainer assemblies a seal was subjected to 4,000 pounds compressive force producing 16,000 psi at 550 degrees F. The compressed expanded seal does not extrude at such temperatures and pressures, and provides substantial resistance to the corrosive effects of well fluids.

What is claimed is:

1. A well tool seal for sealing between spaced surfaces consisting essentially of:
   a composite of 70% to 80% fluorocarbon resins and poly arylene ketone wherein 55% to 65% is fluorocarbon resins and 35% to 45% is poly arylene ketone; and
   20% to 30% is carbon fibers.

2. A well tool seal according to claim 1 where said fluorocarbon resins consist essentially of 90% to 95% poly tetrafluoroethylene and 5% to 10% a copolymer having a tetrafluoroethylene backbone with a fully fluorinated alkoxy side chain.

3. A seal in accordance with claim 2 in the form of an annular member configured to fit between spaced concentric cylindrical surfaces for radial expansion between said surfaces responsive to longitudinal compressive forces.

4. A seal in accordance with claim 3 wherein said annular member is provided with internal longitudinally spaced groove for controlling buckling of said member when compressed longitudinally for increasing the stress in said member along the central portion thereof.

5. A seal in accordance with claim 4 in combination with end retainer assemblies each comprising an anti-extrusion ring, a mesh backup ring, and an end backup shoe.

6. A seal in accordance with claim 5 wherein said anti-extrusion ring and said backup ring comprise a knitted wire and asbestos fiber mesh and said backup shoe is mild steel.

7. A seal in accordance with claim 6 wherein said seal is provided with internal longitudinally spaced V-shaped grooves for controlling buckling of said seal when subjected to longitudinal compressive forces.

8. A well tool seal for sealing between spaced surfaces consisting essentially of:
   about 42% poly tetrafluoroethylene;
   about 2% copolymer having a tetrafluoroethylene backbone with a fully fluorinated alkoxy side chain;
   about 29% poly arylene ketone; and
   about 27% carbon fiber having a tensile strength of 200,000 pounds per square inch, a tensile modulus of 25,000,000 pounds per square inch, and a density of 0.072 pounds per cubic inch.

9. A seal in accordance with claim 8 in the form of an annular member configured to fit between spaced concentric cylindrical surfaces for radial expansion between said surfaces responsive to longitudinal compressive forces.

10. A seal in accordance with claim 9 wherein said annular member is provided with internal longitudinally spaced grooves for controlling buckling of said member when compressed longitudinally for increasing the stress in said member along the central portion thereof.

11. A seal in accordance with claim 10 in combination with end retainer assemblies each comprising an anti-extrusion ring, a mesh backup ring, and an end backup shoe.

12. A seal in accordance with claim 11 wherein said anti-extrusion ring and said backup ring comprise a knitted wire and asbestos fiber mesh and said backup shoe is mild steel.

13. A seal in accordance with claim 12 wherein said seal is provided with internal longitudinally spaced V-shaped grooves for controlling buckling of said seal when subjected to longitudinal compressive forces.

14. A well tool seal for sealing between spaced surfaces consisting essentially of:
   about 35%–49% poly tetrafluoroethylene;
   about 2%–5% copolymer having a tetrafluoroethylene backbone with a fully fluorinated alkoxy side chain;
   about 25%–36% poly arylene ketone; and
   about 20%–30% carbon fiber having a tensile strength of 200,000 pounds per square inch, a tensile modulus of 25,000,000 pounds per square inch, and a density of 0.072 pounds per cubic inch.

15. A seal in accordance with claim 14 in the form of an annular member configured to fit between spaced concentric cylindrical surfaces for radial expansion between said surfaces responsive to longitudinal compressive forces.

16. A seal in accordance with claim 15 wherein said annular member is provided with internal longitudinally spaced recesses for controlling buckling of said member when compressed longitudinally for increasing the stress in said member along the central portion thereof.

17. A seal in accordance with claim 16 in combination with end retainer assemblies comprisiing an anti-extrusion ring, a mesh backup ring, and an end backup shoe.

18. A seal in accordance with claim 17 wherein said anti-extrusion ring and said backup ring comprise a knitted wire and asbestos mesh and said backup shoe is fabricated of mild steel.

19. A seal in accordance with claim 18 wherein said seal element is provided with internal longitudinally spaced V-shaped grooves for controlling buckling of said element when subjected to longitudinal compressive forces.

20. A well tool seal for sealing between spaced surfaces comprising a composite consisting essentially of:
   39% to 52% fluorocarbon resins;
   25% to 36% poly arylene ketone; and
   20% to 30% carbon fibers.

* * * * *